United States Patent [19]

Holcombe, Jr.

[11] 4,148,663

[45] Apr. 10, 1979

[54] REFRACTORY CONCRETES

[75] Inventor: Cressie E. Holcombe, Jr., Knoxville, Tenn.

[73] Assignee: The United States of America as represented by the United States Department of Energy, Washington, D.C.

[21] Appl. No.: 808,486

[22] Filed: Jun. 21, 1977

[51] Int. Cl.$^2$ .............................................. C04B 9/00
[52] U.S. Cl. ................................................ 106/105
[58] Field of Search .................. 106/57, 73.2, 85, 105, 106/106

[56] References Cited

U.S. PATENT DOCUMENTS

| 2,703,762 | 3/1955 | Slayter | 106/105 |
| 3,447,938 | 6/1969 | Vassilevsky | 106/105 |

FOREIGN PATENT DOCUMENTS

| 471820 | 2/1951 | Canada | 106/105 |
| 477141 | 10/1975 | U.S.S.R. | 106/73.2 |

*Primary Examiner*—James Poer
*Attorney, Agent, or Firm*—Dean E. Carlson; Stephen D. Hamel; Allen H. Uzzell

[57] ABSTRACT

Novel concrete compositions comprise particles of aggregate material embedded in a cement matrix, said cement matrix produced by contacting an oxide selected from the group of $Y_2O_3$, $La_2O_3$, $Nd_2O_3$, $Sm_2O_3$, $Eu_2O_3$ and $Gd_2O_3$ with an aqueous solution of a salt selected from the group of $NH_4NO_3$, $NH_4Cl$, $YCl_3$ and $Mg(NO_3)_2$ to form a fluid mixture; and allowing the fluid mixture to harden.

13 Claims, No Drawings

REFRACTORY CONCRETES

This invention was made in the course of, or under, a contract with the United States Energy Research and Development Administration.

BACKGROUND OF THE INVENTION

It relates in general to the field of cements and concretes and more specifically to cements and concretes based on yttrium and the lanthanides. Cements based upon oxides are useful in a variety of applications because of their refractory nature and resistance to high temperature interactions with metals, carbon and other refractories. Cements and concretes based on yttrium oxide are particularly useful in melting and casting operations because they do not contaminate or react with molten reactive metals such as uranium. Concretes and cements based on europium oxide and gadolinium oxide are useful as neutron absorbers for reactor applications. Other lanthanide oxide cements are useful in general fabrication technology for making ceramic ware resistant to high temperatures.

PRIOR ART

In the prior art, $Y_2O_3$ cements of the oxide-acid type have been reported. These cements are of the oxide/phosphoric acid type and are more fully described by W. D. Kingery in "II, Cold-Setting Properties," J. Amer. Ceram. Soc., 33[8] pp. 242-7 (1950); S. L. Golynko-Vol'Fson et al in "Some Principles of the Appearance of Binding Properties in Phosphate Systems," J. Applied Chem. (Russ.) 38[7] pp. 1441-5 (1965); and Chem. Abst.[63] 1905(F) (1965) and by N. F. Federov, in "Cements Based on Systems of the Metal Oxide-Acid Type," J. Appl. Chem. of the USSR (Russ.) 41 [12] 2591-2 (1966). Sorel cements based upon mixed oxy- or hydroxy-salt binder phases in the $MgO-MgCl_2-H_2O$ system are well-known; see, for example, C. A. Sorrell et al, "Reaction and Equilibria in Magnesium Oxychloride Cements," J. Amer. Ceram. Soc. 59 [1-2] pp 51-4 (1976). Rare earth-based porous plasters are described in commonly assigned copending U.S. patent application Ser. No. 617,126, filed Sept. 26, 1975, now U.S. Pat. No. 4,087,573.

One limitation of rare earth-based plasters is their low mechanical strength and high porosity (50% or more). Though they are useful as insulators and neutron absorbers, their utility as structural materials and coating compositions is limited. Attempts to prepare rare earth oxide plasters having less than 50% porosity from oxide-acid mixtures have been unsuccessful.

SUMMARY OF THE INVENTION

It is an object of this invention to provide castable yttrium or rare earth compositions which set up into denser, stronger materials than rare earth plasters.

It is a further object to provide castable yttrium or rare earth compositions which set up into a concrete having less than 40% porosity.

It is a further object to provide concrete compositions which are resistant to high temperatures and are inert to molten uranium.

It is a further object to provide concrete compositions which are useful in the fabrication of neutron absorbers containing europium or gadolinium.

These and other objects are achieved according to this invention in a concrete composition having less than 40% porosity, said composition comprising an aggregate material embedded in a cement matrix, said cement matrix produced by contacting an oxide selected from the group of $Y_2O_3$, $La_2O_3$, $Nd_2O_3$, $Sm_2O_3$, $Eu_2O_3$ and $Gd_2O_3$ with an aqueous solution of salt selected from the group of $NH_4NO_3$, $NH_4Cl$, $YCl_3$, and $Mg(NO_3)_2$ to form a fluid mixture, and allowing the fluid mixture to harden. Useful aggregate materials include $Y_2O_3$, $La_2O_3$, $Nd_2O_3$, $Sm_2O_3$, $Eu_2O_3$, $Gd_2O_3$, $Al_2O_3$ and $ZrO_2$. When $ZrO_2$ is used as an aggregate with $Y_2O_3$ as the oxide forming the cement matrix, a very high temperature concrete results.

DETAILED DESCRIPTION

It has been found according to this invention that tough, castable and sinterable concretes having less than 40% porosity and comprising aggregate particles embedded in a cement matrix can be provided by contacting an oxide powder selected from the group of $Y_2O_3$, $La_2O_3$, $Nd_2O_3$, $Sm_2O_3$, $Eu_2O_3$ and $Gd_2O_3$ (referred to herein as binder oxides) with an aqueous nitrate or chloride salt solution. The salt in the aqueous solution can be, for example, $NH_4NO_3$, $NH_4Cl$, $YCl_3$, $Mg(NO_3)_2$ or hydrated species such as $YCl_3 \cdot 6H_2O$. When the oxide powder is maintained in contact with the salt solution for sufficient time, the mixture spontaneously hardens or sets up into a rigid concrete which contains particles of aggregate material embedded in a cement matrix. The cement matrix (or binder phase) is produced by the reaction of the salt solution and the oxide powder. The concrete can contain non-reactive compounds such as $Al_2O_3$ or CaO-stabilized $ZrO_2$ as aggregates or can be prepared containing no non-reactive material. The aggregate in the latter is unreacted particles of the binder oxide. Accordingly, the non-reactive compounds used as aggregates are defined as compounds which do not participate in the formation of the binder phase, but which actually react to some degree with the binder phase at the particle surface to provide an adhesive bond, thereby strengthening the concrete. When the aqueous salt solution is $NH_4NO_3$, $YCl_3$, or $NH_4Cl$, the cement matrix is believed to have the nominal concentration of $M_2(OH)_5NO_3 \cdot 1H_2O$ or $M_2(OH)_5Cl \cdot 1H_2O$ where M is the metal of the binder oxide powder; Y, La, Nd, Sm, Eu and Gd. These binder phases in the concrete appear to have the same composition as those found in the rare earth plasters produced from oxide-HCl or oxide-$HNO_3$ suspensions as described in commonly assigned U.S. patent application Ser. No. 617,126, now U.S. Pat. No. 4,087,573.

The concretes of this invention are most easily formed by simply adding the binder oxide powder (plus non-reactive powder as aggregate, if desired) to an aqueous solution of the selected salts. Of primary interest are those concretes which have a porosity of less than 40%. While more porous concretes can be prepared by the general method herein described, such materials have low mechanical strength and in many cases are prepared more economically according to Ser. No. 617,126. The concentration of the salt solution must be at least 0.4 molar in order for the resulting mixture to spontaneously harden into concrete. The upper limit of the salt concentration for the $YCl_3$, $Mg(NO_3)_2$, and $NH_4Cl$ solutions appears to be the saturation point of the aqueous solution. For $NH_4NO_3$ solution, the upper limit is about 23.3 m (molal). Above 23.3 m $NH_4NO_3$, the resulting concrete cannot be mixed because precipitating $NH_4NO_3$ crystals cause the liquid phase to be quite viscous. Even if mixing is achieved, the excess $NH_4NO_3$ crystals would impede or prevent the interlocking of the needles and/or plates which make up the binder phase. Furthermore, the excess $NH_4NO_3$ volatilizes upon heating below 250° C., creating excess porosity and weakening the structure, causing cracks to develop. The liquid/powder ratio for forming the concretes is at least 0.5. As used herein, the liquid/powder or L/P ratio is ml of liquid/g of powders. Below 0.5 L/P, a stiff non-workable paste results. The preferred L/P ratio is about 0.6 to 0.8 with respect to binder oxide powder. If excess liquid is present, the concrete hardens beneath the excess liquid.

The porosity of the concretes of this invention depends upon three fabrication variables; the liquid/powder ratio, the size of binder oxide and aggregate particles, and the concentration of the salt solution. Concretes having lower porosities are prepared with smaller particles, lower liquid/powder ratios, and more concentrated salt solutions. The following tables demonstrate the fabrication and properties of various concretes prepared according to this invention.

A variety of concretes were prepared from $Y_2O_3$ powder of two types. Type A had a mean crystallite diameter of 0.06 micron over a range of 0.05–0.14 micron and a 3.45 micron agglomerate diameter over a range of 1.59–7.26 microns. Type B had a mean crystallite diameter of 7.56 microns over a range of 3.51–14.95 with minimal agglomeration. The ranges do not include the upper or lower 10% of the particles or agglomerates.

Several salt solutions were tested for concrete forming tendencies with $Y_2O_3$ powder, and results are depicted in Table I. The salt solutions (representing the liquid in the L/P ratio) are reported as molality (moles of salt/1000 g water). Type A $Y_2O_3$ powder was used. After blending $Y_2O_3$ with the salt solution, the resulting mixture was allowed to stand at room temperature at a controlled 81.1% relative humidity (from a saturated $(NH_4)_2SO_4$ solution). For electron microscopy observations, the dimensions are diameter for plates, length for needles, and largest dimensions for particles. The primary shape of the particles is underlined.

TABLE I

SALT SOLUTIONS TESTED FOR CONCRETE FORMATION WITH YTTRIA

| Salt | Concentration of Salt Solution (m) | L/P Ratio | Approximate Time for Initial Set | Effect of Drying (at 50° C. for 24–48 hrs) | Percent Linear Drying Shrinkage (for 2.25cm samples) | General Comments | Scanning Electron Microscopy Observations |
|---|---|---|---|---|---|---|---|
| $NH_4NO_3$ | 13.9 | 0.6 | < 48 Hr | No Cracks | ~ 0 | Very hard after drying. | 0.75–1.75 μm plates and needles present as the bonding phase. |
| $NH_4Cl$ | 6.9 | 0.75 | ~ 4 Wk | No Cracks | ~ 5 | Weakly set, but becomes hard on drying. | 0.25–1 μm plates and needles as the bonding phase. |
| $(NH_4)_2SO_4$ | 5.5 | 0.6 | < 48 Hr | Cracked | | | 2.5–10 μm chunky particles. |
| $(NH_4)_2CO_3$ | 5.5 | 0.75 | ~ 4 Wk | No Cracks | ~ 0 | Weakly set; resembles chalk. | 0.5–2 μm needles as the bonding phase. |
| $Mg(NO_3)_2$ | 4.4 | 0.6 | < 1 Wk | Few Cracks on Top | ~ 4 | Very hard after drying. | 4–13 μm chunky particles. |
| $MgCl_2$ | 2.7 | 0.75 | No Set | | | Not hard after drying. | 3–12 μm chunky particles. |
| $MgSO_4$ | 3.5 | 0.8 | < 2 Wk | Cracked | | | 2.5–7.5 μm chunky particles |
| $Y(NO_3)_3 \cdot \eta H_2O$ | 1.4 (based on $\eta$-6) | 0.8 | < 1 Wk | Badly Cracked | | Cracked before drying after ~1 wk. | 1.25–3.4 μm plates and needles as the bonding phase |
| $YCl_3 \cdot \eta H_2O$ | 1.3 (based on $\eta$-6) | 0.65 | <48 Hr. | No Cracks | ~ O | Hardening begins at ~ 1 hr; very hard after drying | 0.25–0.75 μm plates and needles as the bonding phase. |

The samples prepared with sulfates and $Y(NO_3)_3 \cdot \eta H_2O$ formed concretes but cracked badly on drying. The $MgCl_2$ sample did not set up, and the $(NH_4)_2CO_3$ sample set up weakly, resembling chalk after drying. The samples which hardened with minimal or no cracking were formed from $NH_4NO_3$, $Mg(NO_3)_2$, $YCl_3 \cdot \eta H_2O$, and $NH_4Cl$ solutions, and were examined by x-ray step scanning techniques. The XRD pattern of concretes produced from $NH_4NO_3$ solution showed $Y_2O_3$ and the nominal $Y_2(OH)_5NO_3 \cdot 1H_2O$ phase which is observed in plasters prepared according to Ser. No. 617,126. The XRD pattern for the concretes produced from $NH_4Cl$ and $YCl_3 \cdot \eta H_2O$ showed $Y_2O_3$ and the nominaL $Y_2(OH)_5Cl \cdot 1H_2O$ phase also observed in the Ser. No. 617,126 plasters. In each case, from relative peak height, the unreacted $Y_2O_3$ appeared to be the major phase, however, quantitative XRD showed only a minor amount of unreacted $Y_2O_3$ was present (typically about 13 wt.%). The XRD pattern of the concrete prepared from 4.4 M $Mg(NO_3)_2$ solution and the $Y_2O_3$ is shown in Table II and possibly represents a yttrium magnesium hydroxynitrate, since no free $Mg(NO_3)_2$ was detected.

TABLE II

X-Ray Diffraction Pattern Of Concrete Formed By The Addition Of $Mg(NO_3)_2$ Solution (4.4 m) to $Y_2O_3$ Powder

| d-spacings | $I/I_{100}$* | $I/I_{100}$± |
|---|---|---|
| 10.33 | 18 | 100 |
| 9.11 | 8 | 44 |
| 8.75 | 4 | 22 |
| 8.54 | 3 | 17 |
| 8.34 | 4 | 22 |
| 7.89 | 3 | 17 |
| 4.34 | + | 10 |
| 3.07 | + | 100 |
| 2.66 | + | 24 |
| 2.50 | + | 5 |
| 2.38 | + | < 1 |
| 2.27 | + | 6 |
| 2.17 | + | < 1 |
| 2.08 | + | 8 |

TABLE II-continued

X-Ray Diffraction Pattern Of Concrete Formed By The
Addition Of Mg(NO₃)₂ Solution (4.4 m) to Y₂O₃ Powder

| d-spacings | I/I₁₀₀* | I/I₁₀₀± |
|---|---|---|
| 1.941 | + | 3 |
| 1.879 | + | 43 |
| 1.822 | + | 2 |
| 1.724 | + | 5 |
| 1.682 | + | 1 |
| 1.639 | + | 4 |
| 1.615 | + | 28 |
| 1.565 | + | 5 |
| 1.534 | + | 4 |
| 1.502 | + | 2 |
| 1.472 | + | 1 |
| 1.445 | + | 3 |
| 1.419 | + | 1 |
| 1.348 | + | 2 |
| 1.327 | + | 4 |
| 1.308 | + | 3 |
| 1.295 | + | 1 |
| 1.269 | + | 2 |
| 1.252 | + | 1 |
| 1.234 | + | 1 |
| 1.218 | + | 6 |

*Peak height intensities, diffractometer, copper Kα radiation
± Excluding Y₂O₃ spacings
+ = Y₂O₃

Table III presents some physical properties of concretes prepared from $Y_2O_3$ and the salt solution. The concretes were prepared with a L/P ratio of 0.6–0.75 and cured at 81.1% humidity for 30 days, and dried. The concentration of solutions is given in molality, with approximate molarity in brackets. The properties were determined with a mercury intrusion porosimeter. The reported weight loss is based on thermogravimetric analysis. While the concrete prepared from $YCl_3 \cdot \eta H_2O$ had a porosity greater than 40%, it was prepared with a dilute salt solution. Porosity less than 40% can be obtained from the same particle size and L/P ratio with about 2.3 m $YCl_3 \cdot \eta H_2O$ solution.

Table IV demonstrates the effects of ammonium nitrate concentrations and particle sizes on the properties of the concretes. The concretes were prepared with L/P of 0.7, cured 30 days, in 81.1% relative humidity, and dried. The salt concentrations are in molality and the properties were determined by a mercury intrusion porosimeter. As seen, the porosity and surface area decrease and the density and specific gravity increase with increasing salt concentration. The smaller particles (A) which initially have a higher surface area give a denser, less porous material on setting. The minimum $NH_4NO_3$ concentration for preparing a $Y_2O_3$-based concrete having less than 40% porosity using type B particles and 0.7 L/P ratio is about 12.8 m.

TABLE IV

COMPARISON OF YTTRIA CONCRETES PREPARED WITH DIFFERENT AMMONIUM NITRATE CONCENTRATIONS AND PARTICLE SIZES

| Concentration of NH₄NO₃ (m) | Powder Type | Bulk Density (g/cm³) | Apparent Specific Gravity | Porosity (%) | Surface Area (m²/g) | Pore Diam. (μm) | Percentage of Pores Less Than 10μm Diameter |
|---|---|---|---|---|---|---|---|
| 3.1 | B | 1.41 | 3.19 | 55.7 | 18.7 | 0.9 | 98.8 |
| 12.5 | B | 1.77 | 3.08 | 42.5 | 14.8 | 1.0 | 97.6 |
| 13.9 [~8.5M] | B | 1.84 | 2.95 | 37.6 | 11.4 | 0.8 | 99.1 |
| 23.3 | B | 1.95 | 2.71 | 27.9 | 5.0 | 0.2 | 99.8 |
| 13.9 | A | 1.94 | 2.79 | 30.4 | 15.9 | 0.1 | 100.0 |
| 23.3 | A | 1.97 | 2.81 | 29.7 | 7.5 | 1.1 | 97.7 |

Table V demonstrates the effect of sintering on $NH_4NO_3$-$Y_2O_3$ concrete. The concrete was prepared from 13.9 m $NH_4NO_3$ solution with L/P 0.6 using Type A powder. The concrete was cured for 30 days at 81.1% relative humidity and dried at 50° C. for 24–48 hours. The values, except linear shrinkage, were determined by a mercury intrusion porosimeter. The theoretical (x-ray) density of $Y_2O_3$ is 5.03 g/cm³. The sintering was carried out in argon as follows: heated at 35° C./hr. to 600° C., 175° C./hr. from 600° to 1350° C., held for 15 minutes at 1350° C., and cooled to room temperature in about 4 hours. It is shown that the density increases, the % porosity increases, and the apparent specific gravity increases to near theoretical density. The pore diameter increases substantially and the surface area decreases. Additional sintering time at above 1300° C. will cause further densification and the porosity will reduce to below its original value in the unsintered material.

TABLE V

COMPARISON BETWEEN AS-FORMED AND SINTERED NH₄NO₃-PRODUCED YTTRIA CONCRETE

| | As-Formed | Sintered |
|---|---|---|
| Linear shrinkage (%) | ~ 0 | ~ 18 |
| Bulk Density (g/cm³) | 1.94 | 2.89 |
| Apparent specific gravity | 2.79 | 4.96 |
| Porosity (%) | 30.4 | 41.7 |
| Surface area (m²/g) | 15.9 | 1.85 |
| Average pore diameter (μm) | 0.1 | 0.5 |
| Percentage of pores less Than 10 μm diameter | 99.98 | 99.34 |

TABLE III

PHYSICAL PROPERTIES OF SOME YTTRIA CONCRETES PREPARED WITH SALT SOLUTIONS

| Salt | Concentration of Salt Solution (m) | Powder Type | Bulk Density (g/cm³) | Apparent Specific Gravity | Porosity (%) | Surface Area (m²/g) | Average Pore Diam. (μm) | Percentage of Pores less than 10 μm Dia. (%) | Total Percentage Weight Loss on Heating to 1500° C. in Argon (%) |
|---|---|---|---|---|---|---|---|---|---|
| NH₄Cl | 6.9 [~4.6M] | A | 1.89 | 3.03 | 37.7 | 23.6 | 0.3 | 99.3 | 29.5 |
| Mg(NO₃)₂ | 4.4 [~3.7M] | A | 2.48 | 3.19 | 22.1 | 0.5 | 3.1 | 95.2 | 27.5 |
| Mg(NO₃)₂ | 4.4 [~3.7M] | B | 2.19 | 3.36 | 34.9 | 0.5 | 2.2 | 99.0 | — |
| YCl₃ · ηH₂O[η~6] | 1.3 [~1.2M] | A | 1.62 | 3.16 | 48.7 | 45.0 | 0.2 | 99.7 | 23.5 |

Table VI demonstrates the physical properties of concretes prepared from rare earth oxides. The concretes were prepared from 13.9 m $NH_4NO_3$ with L/P of 0.8 and cured 30 days at 81.1% relative humidity. The starting oxide powders were 99 wt.% pure and were nominally smaller than 500 mesh with an average particle size of 0.1-10 micron. The properties were determined by mercury intrusion porosimeter with samples dried at 50°-α° C. for 24-48 hours. The hardness was determined both before and after drying. Ranks 1-3 are quite hard and 4 and 5 are moderately hard. The $La_2O_3$ cement expanded during drying, breaking its glass container after 5 days. Though these concretes had greater than 40% porosity, concretes having less than 40% porosity can be prepared using a L/P of 0.6 with the same salt concentrations and particle sizes. For a particular particle size and L/P ratio, the $La_2O_3$-, $Nd_2O_3$-, $Sm_2O_3$-, $Eu_2O_3$- and $Gd_2O_3$-based concretes require a salt solution of about the same concentration as do the $Y_2O_3$-based concretes to achieve a porosity less than 40%.

TABLE VI

PHYSICAL PROPERTIES OF LANTHANIDE CONCRETES

| | Starting Oxide | | | | | |
|---|---|---|---|---|---|---|
| | $La_2O_3$ | $Nd_2O_3$ | $Sm_2O_3$ | $Eu_2O_3$ | $Gd_2O_3$ | Comments |
| Hardness Rank | 5 | 1 | 4 | 2 | 3 | No cracking was observed during curing or after drying. Drying shrinkage was ~0 for 2.25 cm samples. Each oxide appeared to begin reacting shortly after mixing, since some ammonia evolved and heating occurred. |
| Approximate time | < 24 h | < 48 h | < 2 wk | < 48 h | < 48 h | |
| Bulk Density g/cm$^3$) | 1.43 | 1.82 | 1.87 | 1.80 | 1.80 | |
| Apparent specific gravity | 3.09 | 3.46 | 3.45 | 3.37 | 3.51 | |
| Porosity (%) | 53.8 | 47.4 | 45.8 | 46.6 | 48.7 | |
| Surface area (m$^2$/g) | 3.6 | 11.0 | 5.6 | 11.3 | 12.6 | |
| Average pore diameter (μm) | 1.9 | 0.3 | 1.4 | 0.4 | 0.7 | |
| Percentage of pores less than 10 μm diameter | 98.3 | 99.5 | 99.0 | 99.5 | 99.1 | |

The formation of the concretes of this invention is a distinctly different process from plaster formation in oxide-acid systems. The plasters generally set up in 5-60 minutes while the concretes generally require more than 24 hours for setting. Furthermore, the setting time for concretes is related to the relative humidity. At room temperature and 50% relative humidity about 10 days is required for setting. At 81.1% relative humidity only 1-2 days is required and at 100% relative humidity setting occurs in less than 24 hours. Additionally, $La_2O_3$ does not react with acids such as $HNO_3$ to form plasters but does form a concrete when contacted with $NH_4NO_3$ according to this invention. Generally, the concretes of this invention have about the same pore diameter and apparent specific gravity as the corresponding Ser. No. 617,126 oxide-acid plasters. The concretes are unexpectedly less porous, however, having generally 25-65% lower porosity and 15-65% greater bulk density than the plasters. It is believed that the use of salt solutions rather than acids slows down the formation of binder phase crystals (needles or plates) in such a fashion that much greater packing occurs, giving rise to low porosity hard concretes.

As mentioned above, the concretes prepared from only binder oxides contain unreacted binder oxide as aggregate. This is accomplished because the oxide powder in both plaster and concrete formation is never completely converted to hydroxy salt binder. For example, in concretes prepared from $Y_2O_3$ and $NH_4NO_3$ solution with an L/P of 0.7, a theoretical salt concentration of 6.4 M would give complete conversion to binder phase composition of $Y_2(OH)_5NO_3 \cdot H_2O$. However, an approximately 8.5 M solution of $NH_4NO_3$ yielded only 85% conversion to the binder phase. It is suspected that the degree of binder formation depends upon the difference between the initial concentration of salt in solution and the final equilibrium concentration of salt in solution. The greater the excess salt concentration, the greater the degree of binder phase formation, however, even saturated salt solutions will not provide 100% conversion of oxide to binder phase, as indicated by unreacted oxide in the XRD pattern. Supersaturated salt solutions are generally undesirable since additional excess salt may volatilize upon sintering, causing cracking. The preferred salt concentration for $NH_4NO_3$ solutions is about 13-14 m with optimum physical properties (for $Y_2O_3$ cements) obtained with 13.9 m salt concentration. For some applications, the oxide particles may be initially of different sizes so that the smaller ones would preferentially react with the salt to form binder with larger particles remaining as aggregate.

An important property of the concretes of this invention is that they are sinterable. The binder phases decompose at about 600° C., so upon sintering generally above 1300° C. for at least about ¼ hours, the concrete is both densified and the binder phase is decomposed, forming the oxide initially used to form the cement. If a non-reactive aggregate such as $Al_2O_3$ is present in the concrete, the sintered product is a mixture of the aggregate and the yttrium or lanthanide oxide. Accordingly, the concretes are useful in fabricating articles comprising $Y_2O_3$, $La_2O_3$, $Nd_2O_3$, $Sm_2O_3$, $Eu_2O_3$ and $Gd_2O_3$. The fluid mixture of oxide and salt solution is cast or otherwise formed into the desired shape and sintered by heating to above 1300° C., whereupon the cement matrix decomposes to form the original oxide which densifies and bonds to the aggregate particles to form tough ceramic material.

The sintering conditions for the concretes of this invention depend upon whether a nitrate or chloride salt was used to produce the binder phase. Thermal analyses have indicated that the $Y_2O_3$-based nitrate concretes can be sintered if sufficiently slow heating rates (e.g. 100° C./hr.) are used below 600° C. Upon heating above about 600° C., the nitrate binder phase decomposes leaving pure $Y_2O_3$ plus any non-reactive aggregate present. Chloride concretes can be heated at conventional heating rates (e.g. 400° C./hr.) and should be sintered in air or $O_2$ because of replacement of chlorine with oxygen at about 600° C. Sintering of chloride concretes in argon or vacuum would be hampered by YOCl evolution above 1400° C. The $Y_2O_3$-based $Mg(NO_3)_2$ concrete results in a $MgO-Y_2O_3$ mixture upon heating above 600° C. and can be sintered at temperatures above 1300° C. This is advantageous in that the concrete can be used as a coating composition, and the MgO-Y$_2$O$_3$ ratio could be tailored to provide a particular thermal expansion coefficient intermediate that of MgO or Y$_2$O$_3$.

An important advantage to the concretes prepared with Y$_2$O$_3$ is that they do not rehydrate upon exposure to moisture as do calcium aluminate concretes. Rehydration of calcium aluminate causes cracking problems upon reheating as well as on storage in normal room air relative humidity.

The use of non-reactive aggregates can reduce the cost of the concrete and permits the formation of concretes having only a thin layer of binder phase between aggregate particles, thereby enhancing the resistance to cracking upon sintering.

For concretes with aggregates other than the binder oxide (such as Al$_2$O$_3$-CaO- or Y$_2$O$_3$-stabilized ZrO$_2$, etc.) a sintering temperature is required that will cause bonding between the thin layer of reactive oxide (from binder phase) and the aggregate. Sintering temperatures should be higher than use temperatures to prevent further shrinkage when the ceramic is used. It is a matter of routine testing to determine appropriate sintering conditions for a particular concrete composition of this invention. For example, concretes having a Y$_2$O$_3$-based binder and an Al$_2$O$_3$ aggregate (usually more than 75 vol. %) can be sintered for 1-2 hours at 1650° C. Eutectics form in the Y$_2$O$_3$-Al$_2$O$_3$ systems which melt at about 1800° C. and sintering should be at least about 150° C. below the melting point of the eutectics to prevent sagging. With a stabilized ZrO$_2$ aggregate, the sintering and use temperature can be substantially higher since the lowest melting composition in the Y$_2$O$_3$-ZrO$_2$ system melts at 2380° C. These sintering and use temperatures can be above 1900° C. with at least 1-2 hours at sintering temperature required for densification. Several non-reactive aggregates were tested to determine whether additional strength was provided. Of concretes prepared from 20 wt.% Y$_2$O$_3$, 80 wt.% −14 + 325 mesh, respectively of Al$_2$O$_3$, SiC, MgO, and CaO-stabilized ZrO$_2$ (CaO= ∼5 wt.%, ZrO$_2$ = ∼95 wt.%) and 13.9 m NH$_4$NO$_3$ solution with L/P ≦0.2 (liquid to total powder), generally the ZrO$_2$ allowed the formation of very hard tough concrete, setting in 24–72 hours. This concrete appeared to become harder on drying at 50° C. for 24 hours, however, after about two days of re-exposure to room temperature air (50% relative humidity), the strength deteriorated due to microcracking. This concrete can be sintered soon after formation at about 2000° C. to result in a very hard, high temperature resistant material. The concrete after sintering has a use temperature of up to 2000° C., which is over 400° C. higher than conventional concretes. The Al$_2$O$_3$ containing concrete was weak, but its strength is significantly improved when prepared from a 75%-25% weight mixture of Al$_2$O$_3$ and Y$_2$O$_3$.

To illustrate a suitable sintering schedule, a cylindrical crucible about 5" high, 5" diameter, and ½" thick was prepared with NH$_4$NO$_3$ solution and 20 wt.% Y$_2$O$_3$ - 80 wt.% CaO-stabilized ZrO$_2$ was cured at room temperature and 100% relative humidity for 36 hours, then dried at 50° C. for 15 hours. The crucible was heated at 100° C./hr. to 600° C., 400° C./hr. to 1950° C., 1 hr. hold at 1950° C., and 300° C./hr. cooldown to 500° C. The sintering took place in a vacuum, less than 10$^{-4}$ torr. A well-sintered crucible resulted. A similar 5" × 5" × ½" crucible was prepared from NH$_4$NO$_3$ solution and a 75 wt.% Al$_2$O$_3$ - 25 wt.% Y$_2$O$_3$ mixture, and cured for 48 hours at room temperature and 100% relative humidity, and dried for 15 hours at 50° C. The dried crucible was heated at 100° C./hr. to 600° C., 250° C./hr. to 1600° C., 2 hr. hold at 1600° C., and 250° C./hr. cooldown to 500° C. The sintering took place at less than 10$^{-4}$ torr. Of course, the sintering time for any concrete composition will depend upon the degree of densification desired and it is well within the skill of the art to work out appropriate sintering schedules for a particular sized object of a particular composition.

When concretes of this invention are to be sintered, the concentration of the initial salt solution should be as low as possible for achieving the desired physical properties in the unsintered article. In this manner the amount of excess salt in the unsintered article will be minimized, thereby reducing the amount of material volatilized during sintering.

Some oxide aggregates behave differently from ZrO$_2$ and Al$_2$O$_3$. For example, MgO aggregates with Y$_2$O$_3$ do not set up from NH$_4$NO$_3$ solutions, however, some strength develops upon drying. SiC aggregates with Y$_2$O$_3$ form weak concretes when SiC makes up more than 80% of the aggregate-oxide mixture. Other suitable aggregate materials can be undoubtedly found by routine testing, and such materials are considered equivalents of those aggregates disclosed herein.

The following examples demonstrate the fabrication and physical properties of concretes prepared according to this invention and containing aggregate materials other than binder oxides.

EXAMPLE I 20 g. of type B Y$_2$O$_3$ powder was dry blended with 80 g. of CaO-stabilized ZrO$_2$ smaller than 2400 microns (−8 mesh). 12 cc of 13.9 m aqueous NH$_4$NO$_3$ solution (liquid to binder oxide ratio of 0.6) was added and the mixture was stirred in a glass beaker. The beaker was mechanically vibrated for about 10 seconds to remove bubbles and was cured for 24 hrs. at room temperature and 81.1% relative humidity. The resulting hardened material was removed by breaking the beaker and dried in flowing air at 50° C. for 24 hrs. Density was measured by ethyl alcohol absorption. The material had an apparent specific gravity of 4.1 ± 0.1, a bulk density of 3.75 ± 0.5 g/cc and an apparent porosity of 10.7 ± 0.1%.

EXAMPLE II 12.5 g. of type B Y$_2$O$_3$ powder was dry blended with 37.5 g. of Al$_2$O$_3$ smaller than 2400 microns (−8 mesh). 8 cc of 13.9 molal aqueous NH$_4$NO$_3$ solution (liquid to binder oxide ratio of 0.64) was added and the mixture was stirred in a glass beaker and mechanically vibrated for 10 seconds to remove bubbles. The mixture was cured and dried as in Example I and the density was measured by ethyl alcohol absorption. The material had an apparent specific gravity of 3.32 ± 0.01, a bulk density of 2.88 ± 0.1 g/cc and an apparent porosity of 13.5 ± 0.05%.

Another application of the concrete of this invention is in coating technology. Y$_2$O$_3$ coatings are used in the art for protecting graphite crucibles, etc. See, for example, the coating composition described in U.S. Pat. No. 4,002,784, which comprises an aqueous suspension of Y$_2$O$_3$ containing sodium carboxymethylcellulose. It was found that by applying such a coating composition to a surface such as graphite and spraying the coated surface with a dilute NH$_4$NO$_3$ solution, or by adding NH$_4$NO$_3$ to the 3% CMC solution followed by normal stirring, that very hard coatings result. The preferred $NH_4NO_3$ concentration is 0.4–0.7 m since the concentration increases on drying. After application, the coatings must be cured about 7–10 days in normal room air (50% relative humidity). As with all of the concretes of this invention, the curing time is reduced to 24–48 hours in 81.1% or greater relative humidity.

The formation of cement phases from $Y_2O_3$, $La_2O_3$, $Nd_2O_3$, $Sm_2O_3$, $Eu_2O_3$ and $Gd_2O_3$ and salt solutions was unexpected and surprising based on experience with plasters. In order to form plasters, acid concentrations greater than about 0.5 M were required to form a spontaneously hardening plaster. Based upon the experience with plasters and the present concretes, it is likely that concretes can be prepared from other chloride and nitrate salts, as well as other halogenide salts, and such concretes are contemplated as equivalents of those described herein.

What is claimed is:

1. A concrete composition having less than 40% porosity, said composition comprising particles of aggregate material embedded in a cement matrix, said cement matrix produced by:
   a. contacting an oxide selected from the group of $Y_2O_3$, $La_2O_3$, $Nd_2O_3$, $Sm_2O_3$, $Eu_2O_3$ and $Gd_2O_3$ with an aqueous solution of a salt selected from the group of $NH_4Cl$, $YCl_3$ and $Mg(NO_3)_2$ to form a fluid mixture; and
   b. allowing the fluid mixture to harden.

2. The concrete of claim 1 wherein said aggregate material is selected from the group of $Y_2O_3$, $La_2O_3$, $Nd_2O_3$, $Sm_2O_3$, $Eu_2O_3$, $Gd_2O_3$, $Al_2O_3$ and $ZrO_2$.

3. The concrete of claim 1 wherein said aggregate is $ZrO_2$.

4. The concrete of claim 1 wherein said aggregate is $ZrO_2$ and said oxide is $Y_2O_3$.

5. The concrete of claim 1 wherein said aggregate is $Al_2O_3$.

6. The concrete of claim 1 wherein said salt is $Mg(NO_3)_2$.

7. The concrete of claim 6 wherein said oxide is $Y_2O_3$.

8. The concrete of claim 1 wherein said salt is selected from the group of $NH_4Cl$ and $YCl_3$.

9. A castable composition produced by contacting an oxide selected from the group of $Y_2O_3$, $La_2O_3$, $Nd_2O_3$, $Sm_2O_3$, $Eu_2O_3$, and $Gd_2O_3$ with an aqueous solution of a salt selected from the group of $NH_4NO_3$, $NH_4Cl$, $YCl_3$ and $Mg(NO_3)_2$ to form a fluid mixture which spontaneously hardens.

10. The castable composition of claim 9 further comprising an aggregate material selected from the group of $Al_2O_3$ and $ZrO_2$.

11. The castable composition of claim 9 in which said oxide is $Y_2O_3$ and further comprising $ZrO_2$ as aggregate material.

12. The castable composition of claim 11 in which said salt is $NH_4NO_3$.

13. The castable composition of claim 9 wherein said salt is selected from the group of $NH_4Cl$ and $YCl_3$.

* * * * *